United States Patent [19]

Milbrandt

[11] Patent Number: 4,631,548
[45] Date of Patent: Dec. 23, 1986

[54] MULTICOLOR INK JET PRINTER

[75] Inventor: Artur Milbrandt, Munich, Fed. Rep. of Germany

[73] Assignee: Siemens Aktiengesellschaft, Berlin & Munich, Fed. Rep. of Germany

[21] Appl. No.: 726,493

[22] Filed: Apr. 23, 1985

[30] Foreign Application Priority Data

Apr. 27, 1984 [DE] Fed. Rep. of Germany ....... 3415825

[51] Int. Cl.$^4$ ............................................. G01D 15/18
[52] U.S. Cl. ................................ 346/1.1; 346/140 R; 358/75
[58] Field of Search ........................... 346/1.1, 140, 75; 358/75, 78

[56] References Cited

U.S. PATENT DOCUMENTS 3,995,279 11/1976 Wiesmuller et al. ................. 346/75
4,320,406 3/1982 Heinzl ................................. 346/140
4,412,225 10/1983 Yoshida ............................. 346/75 X Primary Examiner—Joseph W. Hartary
Attorney, Agent, or Firm—Hill, Van Santen, Steadman & Simpson

[57] ABSTRACT

A multicolor ink jet printer has a plurality of ink reservoirs, for different primary colors, and prints multicolor images by applying matrix dots to the recording medium consisting of a single primary color or a mixture of primary colors. The diameter of the matrix dots formed on the recording medium is maintained constant either by adjusting the volume of ink in each droplet inversely with the number of droplets formed in a matrix dot, or preselecting a constant small volume for the droplets and forming each matrix dot of the same number of droplets, irrespective of whether the matrix dots are formed from a single primary color or a mixture of primary colors.

4 Claims, 6 Drawing Figures

MULTICOLOR INK JET PRINTER

BACKGROUND OF THE INVENTION

1. Field of the Invention

The present invention relates to an ink jet printer and more particularly to such a printer which is adapted to print characters in graphic patterns in multiple colors.

2. The Prior Art

Multicolor printers are known which provide several separate ink reservoirs each containing ink of a different color. See German Pat. No. OS 29 25 812. An optically suitable multicolor representation is possible using inks of the primary colors magenta, cyan and yellow. It is expedient to use black as a fourth color in a multicolor printer.

A major element of the multicolor printer is the print head. The print head has several ink channels arranged which are connected to the various ink reservoirs, and from which individual ink droplets are ejected, under the control of piezoelectric drive elements associated with the individual channels.

The print head and the recording carrier are caused to move relative to each other, and droplets of appropriate color are ejected to various positions on the recording carrier, with the result that multicolor characters or patterns can be represented in dot matrix fashion. The lines and rows of the dot matrix are determined by the relative movement between the recording carrier and the print head, as well as by the frequency of ejection of the ink droplets. In order to produce mixed colors, a given location of the recording carrier is repeated by printed with ink droplets of different primary colors. In this fashion, using the primary color cyan, magenta and yellow, the secondary colors of red, green and blue can be represented.

It frequently occurs with multicolor presentations of characters or patterns that, when different colors meet, the contours are unsharp and the color appears to have a dirty or blurred optical impression. The reason for this is that, in the formation of the mixed colors, several ink droplets of different colors are successively applied to the same point of the recording carrier. With each application, the diameter of the dot is enlarged so that dots or image points of varying diameter result on a recording carrier. This creates the impression that the colors are run together or blurred, an overall unsharp effect. This also applies to the representation of graphics.

It is known, using multicolor printers, to employ a method wherein the image elements or pixels are defined individually in which each exhibit one or more picture points. Each image point is printed by one or more ink droplets. In order to obtain a good color gradation, or desired color mixtures, the individual image points of an image element are filled up according to a specific rule, sometimes referred to as the Dither-matrix. Different image point diameters, such as result from the spraying of individual droplets on top of each other, lead to uncontrolled overlapping at the edges and therefore to erroneous colors in the overlapping regions within a picture element.

It is therefore desirable to provide an apparatus and method for a multicolor ink jet printer to represent both the contours of the characters and patterns more clearly and sharply, as well as to improve the color contrast and color saturation which is achieved.

BRIEF DESCRIPTION OF THE INVENTION

A principal object of the present invention is to provide a multicolor ink jet printer in which the volume of ink contained within each droplet is dependent upon the number of droplets assigned to a given point on the recording medium. In one embodiment of the invention, the volume contained in each droplet is varied in accordance with the total number of droplets to be applied to a given point on the recording medium, with the result that the image dot formed by a variable number of droplets is always constant. In another embodiment of the invention, image points are always made up of a constant plural number of droplets, with a constant volume of ink being supplied in each droplet so that the dots making up the image points achieve a constant diameter.

A significant advantage achieved by the present invention is that the individual picture points exhibit defined dimensions. That is variation in diameters, an undesirable color interferences, are reduced. Simultaneously, the contrast and definition in the marginal regions of the character are markedly increased.

It is advantageous in connection with the invention to influence the control of ink droplet ejection through the control of the amplitude or duration of drive pulses supplied to piezoelectric transducer elements which cause the droplets to be ejected. This has the advantage that the structural construction of an ink jet print head need not be changed, and particularly in that the diameter of the jets need not be changed.

In another embodiment of the invention, with each individual droplet ejection, an equal constant ink volume is ejected onto the recording carrier, whereby the adjustment of the diameter of a dot on the recording carrier is defined independently of whether the dot consists of ink droplets of more than one primary color. The diameter of a dot in this case is determined by the total of the constant number of plural droplets per dot is constant. This arrangement achieves simplicity and reduction of costs in the control circuit.

BRIEF DESCRIPTION OF THE DRAWINGS

Reference will now be made to the accompanying drawings in which.

DESCRIPTION OF THE PREFERRED EMBODIMENTS

Figure 1:
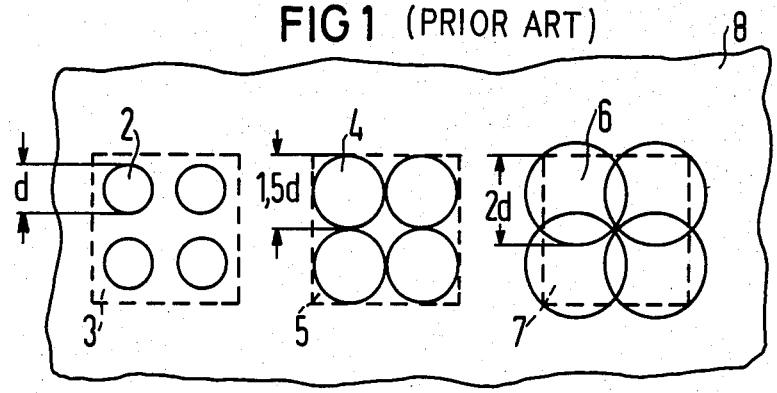
FIG. 1 illustrates an example of a picture element formed in conventional fashion, in which the picture element consists of several picture points of a primary color.

Each of the picture elements, formed as an array of four pixels in two rows and two columns, is illustrated in FIG. 1 on recording carrier 8. Each picture element 3, 5 and 7, consists of four picture dots or points 2, 4 and 6, respectively. The filling up of a picture element is preferably according to the so-called Dither-matrix. In the illustrated example, the picture element 3 consists of four picture dots or points 2 of a primary color F1, F2 or F3 respectively. The four picture points 4 of the picture element 5 are respectively each formed through application of two primary colors F1+F2 or F1+F3 or F2+F3. The four picture points 6 of the picture element 7 are respectively formed through the application of three primary colors F1+F2+F3. It can be seen that the diameter of the picture points on the data carrier is not constant. The diameter becomes enlarged with an increasing number of primary colors applied in the region of the picture point.

If one assumes a diameter d for the diameter of a picture point 2 of the picture element 3, then the diameter of the picture points 4 is approximately 1.5d, and that of the picture points 6 have a diameter of approximately 2d. In the picture element 7, the overlapping of the image dot 6 within the picture element, or of adjacently disposed picture elements, causes a run-together or dirty color impression, and an unsharp contour of the edges of characters or patterns formed by the dots. It is also recognizable in picture elements 3, which are printed with dots of one primary color, that a relatively high proportion of the white recording medium is showing, so that the color impression is overall pale and unsaturated.

Figure 2:
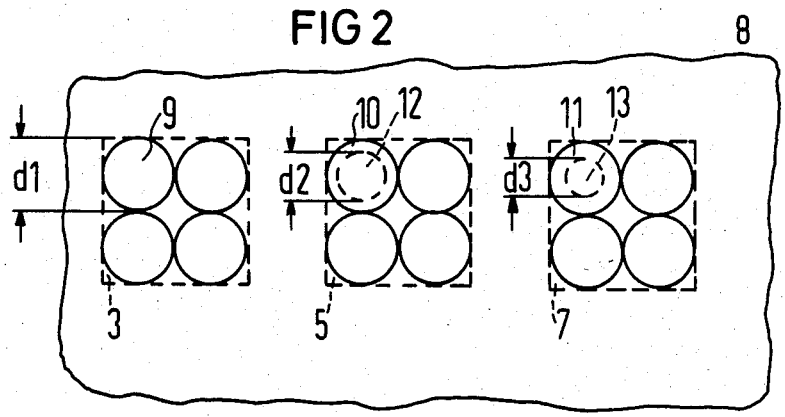
FIGS. 2 and 3 show an example of a picture element formed in accordance with the present invention, in which several picture points are made up of a primary color or several primary colors.

FIG. 2 shows an example employing the present invention. According to this figure, the size of the ejected ink droplets is adjusted in accordance with the number of droplets to be applied to a dot of a picture element, such that dots of equal diameter result. In the picture elements 3, 5 and 7 of FIG. 2, which each consists of four image dots, the image dot diameter d1 is equal, independently of whether the image dot consists of a single primary color F1, F2 or F3, as in the example of image dot 9; or of two primary colors F1+F2 or F1+F3 or F2+F3, as in the example of image dot 10; or of three primary colors F1+F2+F3, as in the example of image dot 11. In the picture elements of FIG. 2, the image dots 12 and 13 are shown in broken lines, to indicate the smaller diameter of each individual drop of a single primary color which is applied. It can be seen from FIG. 2 that the diameters d2 and d3 are smaller than the diameter d1 of a matrix dot formed by application of a single primary color to the picture element 3. Also the diameter d3 is smaller than d2. The volume of each droplet applied to the picture element 5 is such that when two droplets are superimposed on each other, an image dot results having a diameter d1. Similarly, the volume is adjusted when three dots are superimposed with each other within the picture element 7, such that the three superimposed droplets combine to produce a dot having diameter d1, even though each individual droplet would produce a dot of diameter d3 as shown.

Figure 3:
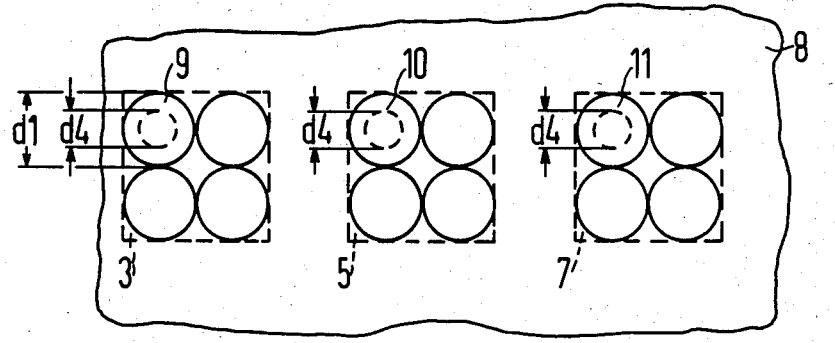

FIG. 3 shows an example of a futher embodiment of the present invention. In this example, it is assumed that fourcolor printing is taking place, in which black ink replaces the superposition of all three primary colors within picture element 7. The picture elements 3, 5 and 7 in FIG. 3 each have four matrix dots 9, 10 and 11 respectively. Each matrix dot 9, 10 and 11 has the same diameter d1. This is achieved by virtue of the fact that the volume of ink droplets of a primary color forming the matrix dot is variable, in accordance with the number of ink droplets to be applied to form the matrix drop, and in which the plural number of ink droplets per matrix dot is constant. In example FIG. 3, two droplets are employed to form each of the matrix dots. The matrix dot 9 consists of two droplets of a primary color F1 or F2 or F3, each of which individually would produce a matrix dot of diameter d4. In the picture element 5, the matrix dots 10 contain two primary colors, applied in the form of two droplets of equal diameter d4 of two of the primary colors F1, F2 and F3. Combined, the two droplets form a diameter d1, whereas each individual droplet would produce a matrix dot of diameter d4. In a picture element 7, the superposition of three primary colors has been replaced by black ink, and two droplets of black ink are applied to form a matrix dot having diameter d1, even though each droplet would itself produce a dot only of diameter d4. Thus the diameter of all of the matrix dots 9, 10 and 11 are equal in FIG. 3.

The constancy of the matrix dot diameters is achieved through a controllable adjustment of the droplet size, or through a control variation of the number of individual droplets to be applied to each matrix drop. In the first case, this is preferable through control of the droplet volume, that is through control of the quantity of ink which is emitted with each droplet ejection to be sprayed on the recording carrier. Since a direct connection exists between the volume of each droplet and the amplitude and duration of a drive pulse for the drive element which produces a droplet ejection, it is advantageous to employ variations in either pulse duration or pulse amplitude for controlling the quantity of ink ejected in each droplet. Both measures have the advantage that no change of the geometry of the ink printing device itself is necessary. Apparatus for controlling pulse amplitude (or level) or duration is shown in copending application of Artur Milbrandt, et al., Ser. No. 726,494, filed of even date herewith, the disclosure of which is hereby incorporated hereinto.

In the arrangement of FIG. 3, the constant diameter achieved for the matrix dots results from the fact that the number of droplets applied to each dot is constant. If a matrix dot consists of droplets of a single primary color, then two droplets of this primary color are applied. In the case of the matrix dot which consists of droplets of two primary colors, one droplet of each color is applied. When the matrix dot is black, two droplets of the color black are applied, instead of three superimposed dots of the three primary colors. As a result, the diameter of the matrix dots all exhibit the same value, independently of whether one or more primary colors were applied.

In a further embodiment of the present invention, the properties of the recording carrier can also be taken into account. This allows control of the diameter of ink droplets applied on recording carriers having different characteristics, which can effect whether the ink penetrates rapidly or slowly into the recording carrier, which affects the apparent matrix dot diameter. In particular, the relevant characteristics are different for different recording media such as foils and papers.

Figure 4:
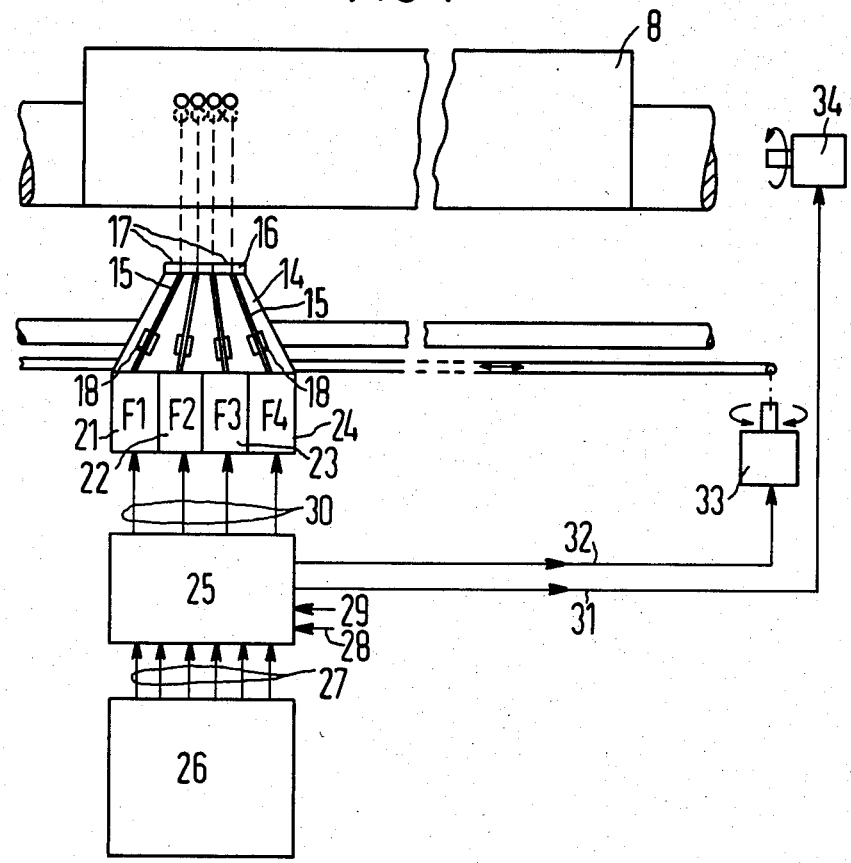
FIGS. 4-6 illustrate apparatus for carrying out the invention.
Figure 5:
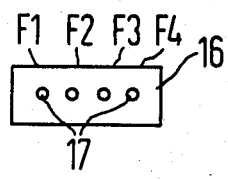
Figure 6:
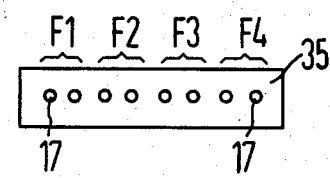

Referring to FIGS. 4–6, apparatus for carrying out the present invention is illustrated. An ink jet printer is illustrated in FIG. 4, having a print head 14 with plural ink channels 15 which terminate at a jet plate 16, spaced from the recording medium 8. The jet plate 16 has a plurality of openings 17, arranged for the construction of a dot like recording image, and droplets emerge from the opening 17 and are sprayed against the recording medium 8. FIG. 5 shows a front view of the jet plate 16, illustrating four apertures, one for each color F1–F4, in a horizontal row.

An individual drive element 18 is associated with each channel 15, and the drive elements 18 take the form of tubular piezoelectric transducers. Each ink channel 15 is connected with one of the four ink reservoirs 21-24, which contain ink of the colors F1, F2, F3 and F4, respectively. The primary colors cyan, magenta and yellow, as well as black, are employed.

The print head of FIG. 4 operates in accordance with the partial vacuum method. In this method, the pressure of the ink within the channel 15 is normally maintained at less than atmospheric, so that the meniscus of the ink is concave at the openings of the jet plate 16.

The print head 14 is arranged on a carriage which is adapted to be moved horizontally relative to the recording medium 8 be means of a drive system including a motor 33. By pulsing the transducers 18, as the print head is moved horizontally across the recording medium 8, droplets of different color ink can be ejected under the recording medium 8 to form a series of matrix dots in a line, the color of the matrix dots being dependent on the color of the ink droplet or droplets applied to each dot. The recording medium 8 also has a drive mechansim incorporating a motor 34, which makes it possible to print successive rows of dots on the recording medium 8.

The transducers 18 are energized by pulses from a control circuit 25. Each time a transducer receives a pulse from the control circuit 25, a shock wave is generated within the associated channel 15 and a droplet is ejected from the opening 17. The underpressure in the exit region of the channel 15 is overcome in order to eject a droplet from the aperture. The channel is refilled by capillary action from the connected reservoir.

Adjustment of the duration of the pulse applied to the transducer 18 is made by the control circuit 25. The unit 25 receives control signals 27 from a unit 26, which may be a character generator, or a memory unit for supplying pulses in time sequence in relation to the movement of the motors 33 and 34, to generate the desired characters and patterns on the recording medium 8. In addition, the control circuit 25 receives other inputs in the form of signals 28 and 29, which are supplied in response to the operation of switches (not shown) which may be opened or closed by the operator in accordance with the physical characteristics of the recording medium 8. This can cause the control circuit 25 to modify the pulses supplied to the transducers in accordance with the properties of the recording medium (whether paper or foil etc.), the absorbtion capacity of the medium, as well as the property of the ink (such as drying time). The control circuit 25 also supplies signals for controlling operation of the motors 33 and 34 for bringing about relative movement between the print head and the recording medium.

As disclosed in the copending Milbrandt et al. application referred to above, the control circuit incorporates apparatus for generating pulses of preselected amplitude and duration in response to input signals, such as the input control signals 28 and 29. One way of controlling the pulse amplitude and duration is to provide an individual pulse generator for each different waveshape which is desired, and then select the appropriate pulse generator in response to a determination of the required droplet volume. This selection may be made by application of a specific control signal to the control unit 25, for actuating the pulse generator. The determination of the required droplet volume is made either by counting the number of droplets to be superimposed in each case, and selecting pulse generators with the same waveshape for each such droplet (when the arrangement of FIG. 2 is used), or by manually selecting the desired droplet volume (for the arrangement based on FIG. 3) to achieve the desired color saturation. Best results are achieved when the matrix dots just touch or overlap each other.

In instances where the droplet sizes are relatively constant, but the number of droplets of a primary color to be applied to each matrix dot is adjustably variable, a print head with a larger number of jet openings can be employed. FIG. 6 illustrates a plan view of the jet plate 35 of such a print head, used with a printer which otherwise has the same construction as illustrated in FIG. 4. The arrangement of FIG. 6 can be used with four colors namely cyan, magenta, yellow and black, and the print head using the jet plate of FIG. 6 has eight ink channels 15 leading to the eight openings 17, with channels of the same color being connected to two adjacent openings. Thus on each horizontal pass of the print head over the recording medium two droplets of the same color can be ejected at any point, by actuating the two transducers for that color at the appropriate times. Also, two drops of different colors can be superimposed by actuating two transducers associated with the desired colors. Each channel has an independent transducer 18. The openings 17 are arranged in a horizontal row, so that when the recording carrier is moved horizontally relative to the recording medium, a raster line may be printed. When two droplets of the same primary color are to be applied to the same matrix dot, then the transducers associated with the two channels leading from a single reservoir are pulsed sequentially, so that two droplets are applied to the same matrix dot. When the matrix dot is to receive droplets of different colors, then the corresponding transducers are pulsed at the appropriate times so that one droplet of one color is ejected and then subsequently, after movement of the jet plate 35, a droplet of a different color is ejected in superposition with the matrix dot formed by the first droplet. In contrast to the example described above in connection with FIG. 4, there is no change in the amplitude or duration of the drive pulses supplied to the transducers. Instead, the sequence of the drive pulses is adjusted so as to actuate two transducers in connection with each matrix dot, so that two droplets are supplied to the recording medium at that point. Because the matrix dots are always formed of two droplets, the diameter of each matrix dot remains constant. Although the above description is in terms of two droplets supplied to each matrix dot, it will be apparent that a different number of droplets may be supplied, as long as the number is constant so that the resulting diameter of the matrix dot is constant.

The above explanation has been on the basis of jet plates which have openings arranged in a horizontal row. It is also possible however to mutually arrange several horizontal rows of apertures in a jet plate, or multiple jet plates, to simultaneously print several raster lines. In this case, the print head contains a corresponding large number of ink channels each with an individual piezoelectric drive element, which are actuated in the manner described.

It will be apparant that various other additions and modifications may be made in the apparatus and method of the present invention with departing from the essential features of novelty thereof which are intended to be defined and secured by the appended claims.

What is claimed is:

1. In a method of representing multi-colored characters employing a print head having a plurality of ink channels with discharge openings directed toward a recording meidum, each ink channel having a piezoelectric drive element for effecting a drop-by-drop ejection of ink from said ink channel to form picture points on said recording medium in response to drive pulses generated by a control circuit in accordance with characters or patterns to be represented, said drive pulses applied to each channel being selectable in terms of number, and in amplitude or duration to select the volume of ink in each drop, a plurality of ink supply reservoirs, each containing a primary color and supplying an individual one of said ink channels, and a drive mechanism for producing relative movement between said print head and said recording medium, the steps of;

applying a single discrete droplet to a first of said picture points and applying two or more discrete droplets to another of said picture points from different ones of said ink channels for the representation of mixed colors, and selecting drive pulses for said ink channels so that each picture point on said recording medium has a constant diameter, regardless of whether such picture point is composed of one discrete droplet of one primary color, or of a plurality of discrete droplets of different primary colors.

2. The method according to claim 2, including the step of ejecting an individual droplet of ink having a greater volume to represent a picture point composed of only one primary color, and having a smaller volume for the representation of a picture point which contains more than one primary color, and having the smallest volume when a picture point is to be represented which contains all said primary colors.

3. The method according to claim 2, including the step of producing a pulse for ejection of individual ink droplets of different primary colors such that the picture points represented on the recording medium each have the same diameter, and selecting the volume of such droplets such that said picture points on said recording medium touch each other in a matrix representing a character or pattern.

4. The method according to claim 2, including the step of applying a constant discrete number of droplets applied to each picture point of said recording medium, said constant number being equal to the number of primary colors of said print head, whereby the picture points represented on the recording medium each have the same diameter and touch each other in a matrix representing a character or pattern.

* * * * *